United States Patent
Markley et al.

(10) Patent No.: US 7,533,484 B2
(45) Date of Patent: May 19, 2009

(54) FISHING POLE, ANTI-WRAP LINE GUIDE FOR A FISHING POLE, AND FISHING ROD

(75) Inventors: Duane C. Markley, Spokane Valley, WA (US); Ron Stokes, Spokane Valley, WA (US)

(73) Assignee: Eagle Mountain Brokers, Inc., Spokane Valley, WA (US)

( * ) Notice: Subject to any disclaimer, the term of this patent is extended or adjusted under 35 U.S.C. 154(b) by 179 days.

(21) Appl. No.: 11/158,554

(22) Filed: Jun. 21, 2005

(65) Prior Publication Data

US 2006/0130388 A1  Jun. 22, 2006

Related U.S. Application Data

(60) Provisional application No. 60/581,511, filed on Jun. 21, 2004.

(51) Int. Cl.
*A01K 87/00* (2006.01)
*A01K 87/04* (2006.01)

(52) U.S. Cl. .............. 43/18.1 HR; 43/18.1 R; 43/24

(58) Field of Classification Search .......... 43/18.1 R, 43/24, 18.1 HR
See application file for complete search history.

(56) References Cited

U.S. PATENT DOCUMENTS

| 343,802 | A | * | 6/1886 | Everett | 43/24 |
| 396,707 | A | * | 1/1889 | Parker | 43/24 |
| 754,094 | A | * | 3/1904 | Roth | 43/24 |
| 1,475,408 | A | * | 11/1923 | Reed | 43/15 |
| 1,586,300 | A | * | 5/1926 | Fields | 43/24 |
| 1,964,631 | A | * | 6/1934 | Hansen | 43/24 |
| 2,230,611 | A | * | 2/1941 | Coffin et al. | 248/63 |
| 2,306,638 | A | * | 12/1942 | Meisler | 43/18.1 R |
| 2,319,462 | A | * | 5/1943 | Kruse | 43/24 |
| 2,328,541 | A | * | 9/1943 | Bachlotte | 43/24 |
| 2,351,734 | A | * | 6/1944 | Backe | 43/18.1 CT |
| 2,398,862 | A | * | 4/1946 | Sarkisian | 43/24 |
| 2,478,131 | A | * | 8/1949 | Rossi | 43/18.1 R |
| 2,484,727 | A | * | 10/1949 | Patterson | 43/24 |
| 2,538,306 | A | * | 1/1951 | Fox et al. | 43/18.1 R |
| 2,538,338 | A | * | 1/1951 | Sturdevant | 43/18.1 R |
| 2,541,759 | A | * | 2/1951 | Hamre | 43/18.1 CT |
| 2,559,933 | A | * | 7/1951 | Briney | 43/18.1 R |
| 2,559,934 | A | * | 7/1951 | Briney | 43/18.1 R |

(Continued)

FOREIGN PATENT DOCUMENTS

JP  57057203 A  *  4/1982

(Continued)

*Primary Examiner*—Darren W. Ark
(74) *Attorney, Agent, or Firm*—Wells St. John P.S.

(57) ABSTRACT

A fishing pole is provided with a handle, a rod, and a closing segment. The rod has a base, a tip end, and a coil spring provided between the base and the tip end. The coil spring is configured to receive and guide a fishing line. The rod is supported by the handle at the base, and the coil spring has a proximal end winding and a distal end winding. The closing segment is provided on one of the proximal end winding and the distal end winding to close the one of the proximal end winding and the distal end winding to prevent wrapping of the fishing line about the coil.

12 Claims, 14 Drawing Sheets

U.S. PATENT DOCUMENTS

| | | | | |
|---|---|---|---|---|
| 2,561,675 A | * | 7/1951 | Ross | 43/24 |
| 2,573,647 A | * | 10/1951 | Marke | 43/24 |
| 2,596,835 A | * | 5/1952 | Benge | 43/24 |
| 2,610,427 A | * | 9/1952 | Caroland | 43/18.1 R |
| 2,697,894 A | * | 12/1954 | Graham et al. | 43/24 |
| 2,702,959 A | * | 3/1955 | Wiglesworth | 43/24 |
| 2,706,096 A | * | 4/1955 | Rufle | 43/24 |
| 2,718,085 A | * | 9/1955 | Bean | 43/24 |
| 2,721,412 A | * | 10/1955 | Smiley | 43/24 |
| 2,759,288 A | * | 8/1956 | Bratek | 43/18.1 R |
| 2,778,141 A | * | 1/1957 | Haas | 43/24 |
| 2,781,602 A | * | 2/1957 | Warford | 43/24 |
| 3,099,889 A | * | 8/1963 | Verneuil | 43/24 |
| 3,216,144 A | * | 11/1965 | Vojinov | 43/18.1 R |
| 3,245,169 A | * | 4/1966 | Kennel | 43/24 |
| 3,415,002 A | * | 12/1968 | Schaefer | 43/18.1 R |
| 3,417,500 A | * | 12/1968 | Carabasse | 43/18.1 HR |
| 3,507,069 A | * | 4/1970 | Borba, Sr. | 43/18.1 R |
| 3,981,095 A | * | 9/1976 | Shepherd | 43/24 |
| 4,654,994 A | * | 4/1987 | Roberts, Jr. | 43/18.1 HR |
| 5,159,776 A | * | 11/1992 | Horton et al. | 43/24 |
| 5,704,157 A | * | 1/1998 | Utsuno et al. | 43/24 |
| 5,934,005 A | * | 8/1999 | Utsuno et al. | 43/24 |
| 5,946,845 A | * | 9/1999 | Yasui et al. | 43/24 |
| 5,953,847 A | * | 9/1999 | Peterson | 43/24 |
| 6,282,830 B1 | * | 9/2001 | Henry | 43/24 |
| 6,408,562 B1 | * | 6/2002 | Sunaga et al. | 43/24 |
| 6,922,936 B2 | * | 8/2005 | Markley et al. | 43/18.1 R |
| 6,931,781 B2 | * | 8/2005 | Markley et al. | 43/18.1 R |
| 7,454,862 B2 | * | 11/2008 | Markley et al. | 43/18.1 R |
| 2005/0005499 A1 | * | 1/2005 | Markley et al. | 43/18.1 R |
| 2005/0055865 A1 | * | 3/2005 | Markley et al. | 43/18.1 R |
| 2005/0268523 A1 | * | 12/2005 | Markley et al. | 43/18.1 R |
| 2007/0033855 A1 | * | 2/2007 | Jung | 43/18.1 R |

FOREIGN PATENT DOCUMENTS

| | | | | |
|---|---|---|---|---|
| JP | 01285137 A | * | 11/1989 | |
| JP | 08308440 A | * | 11/1996 | |
| JP | 09065803 A | * | 3/1997 | |
| JP | 09140295 A | * | 6/1997 | |
| JP | 09191800 A | * | 7/1997 | |
| JP | 11346604 A | * | 12/1999 | |
| JP | 2001224282 A | * | 8/2001 | |
| JP | 2001321032 A | * | 11/2001 | |
| JP | 2002262723 A | * | 9/2002 | |
| JP | 2003174836 A | * | 6/2003 | |
| JP | 2003174837 A | * | 6/2003 | |
| JP | 2004129525 A | * | 4/2004 | |
| JP | 2004135544 A | * | 5/2004 | |
| JP | 2004242650 A | * | 9/2004 | |
| JP | 2005095139 A | * | 4/2005 | |
| JP | 2006197806 A | * | 8/2006 | |

* cited by examiner

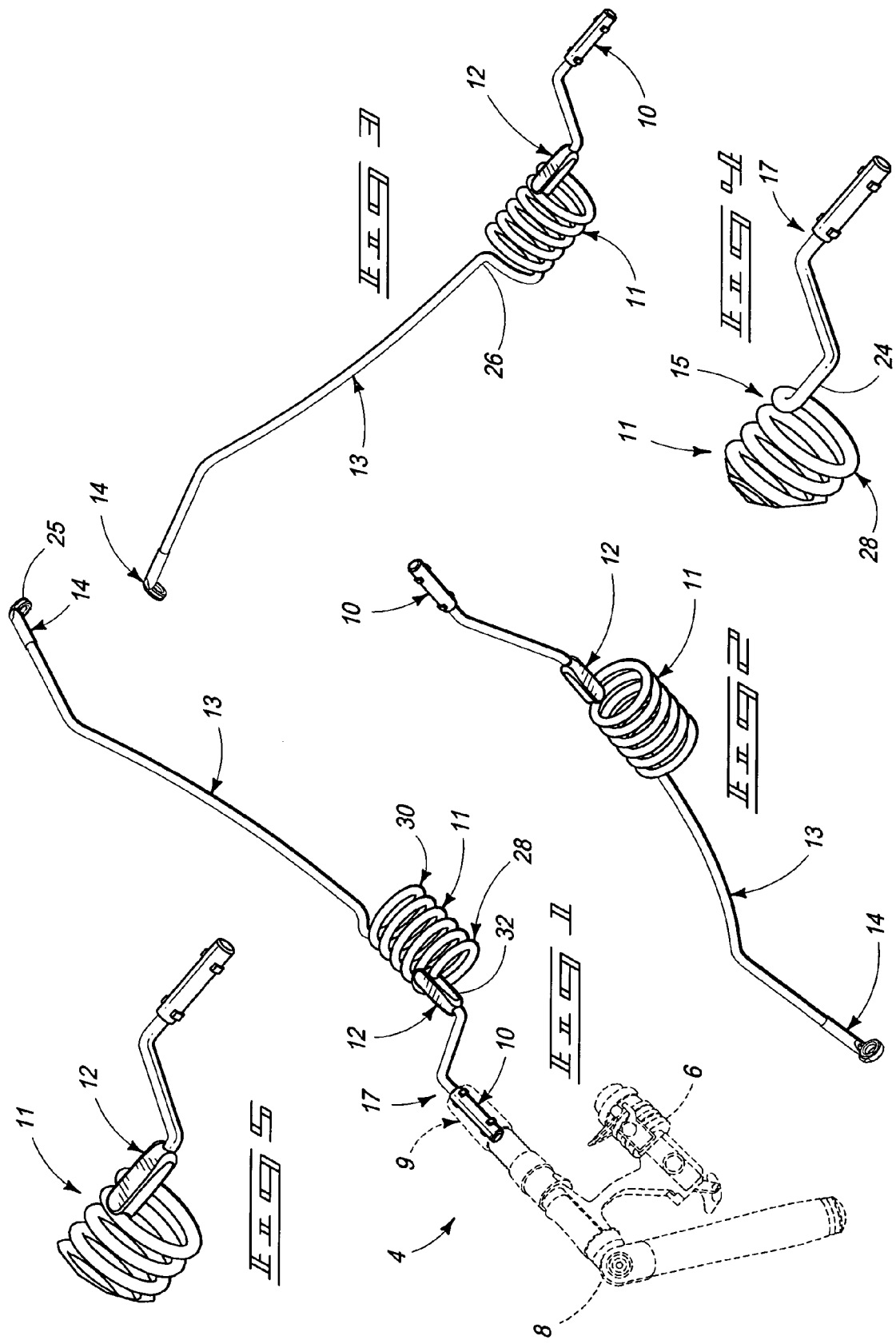

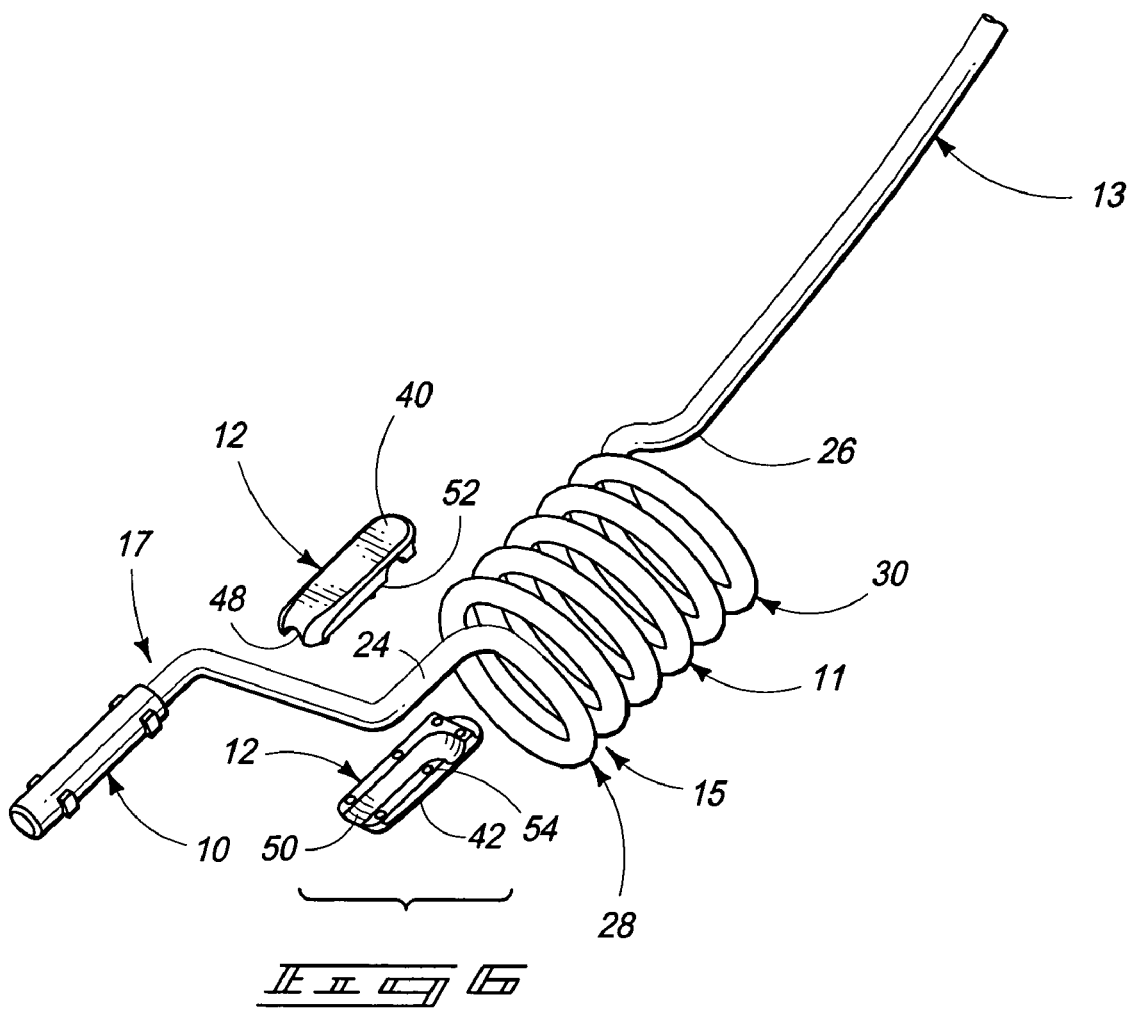

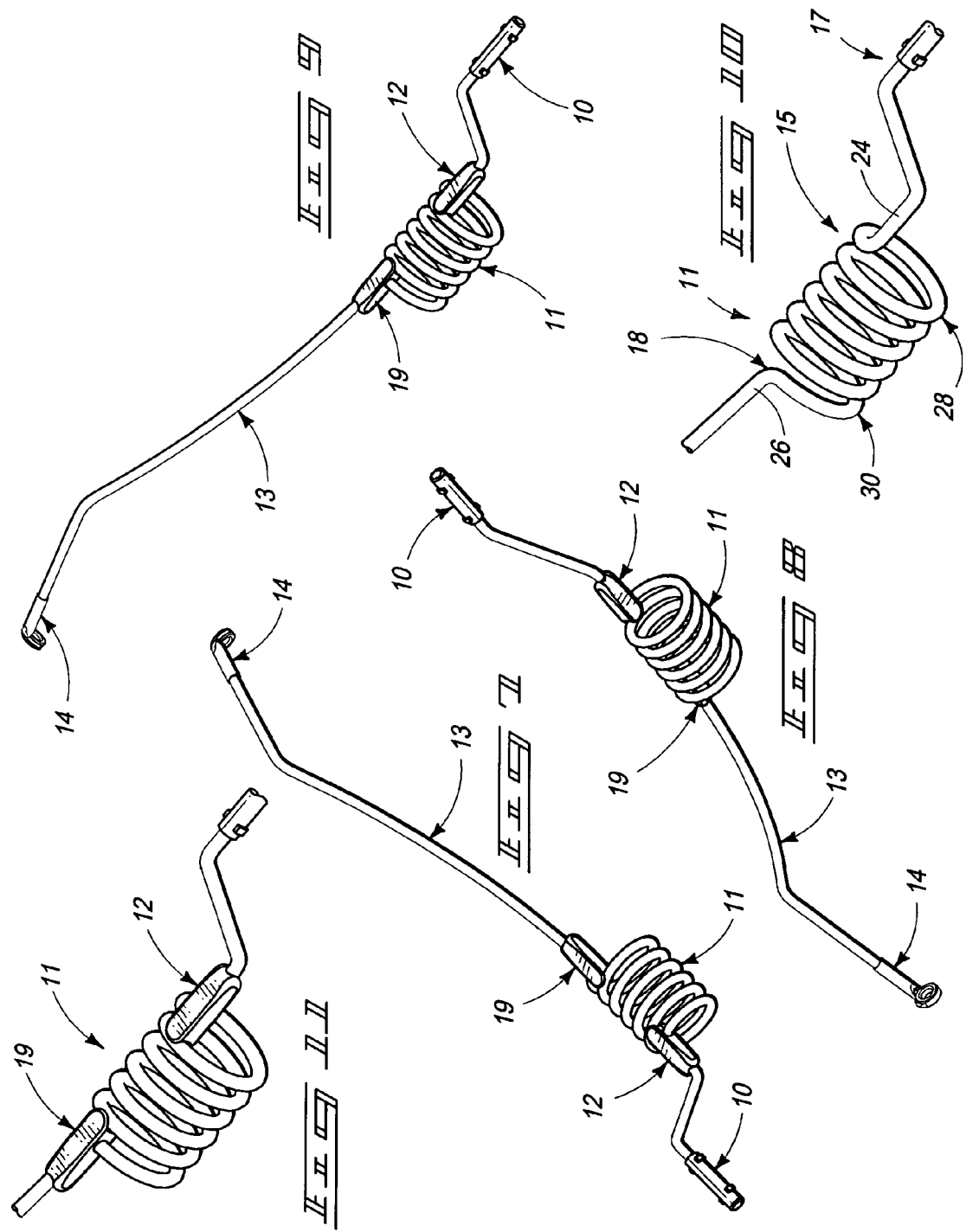

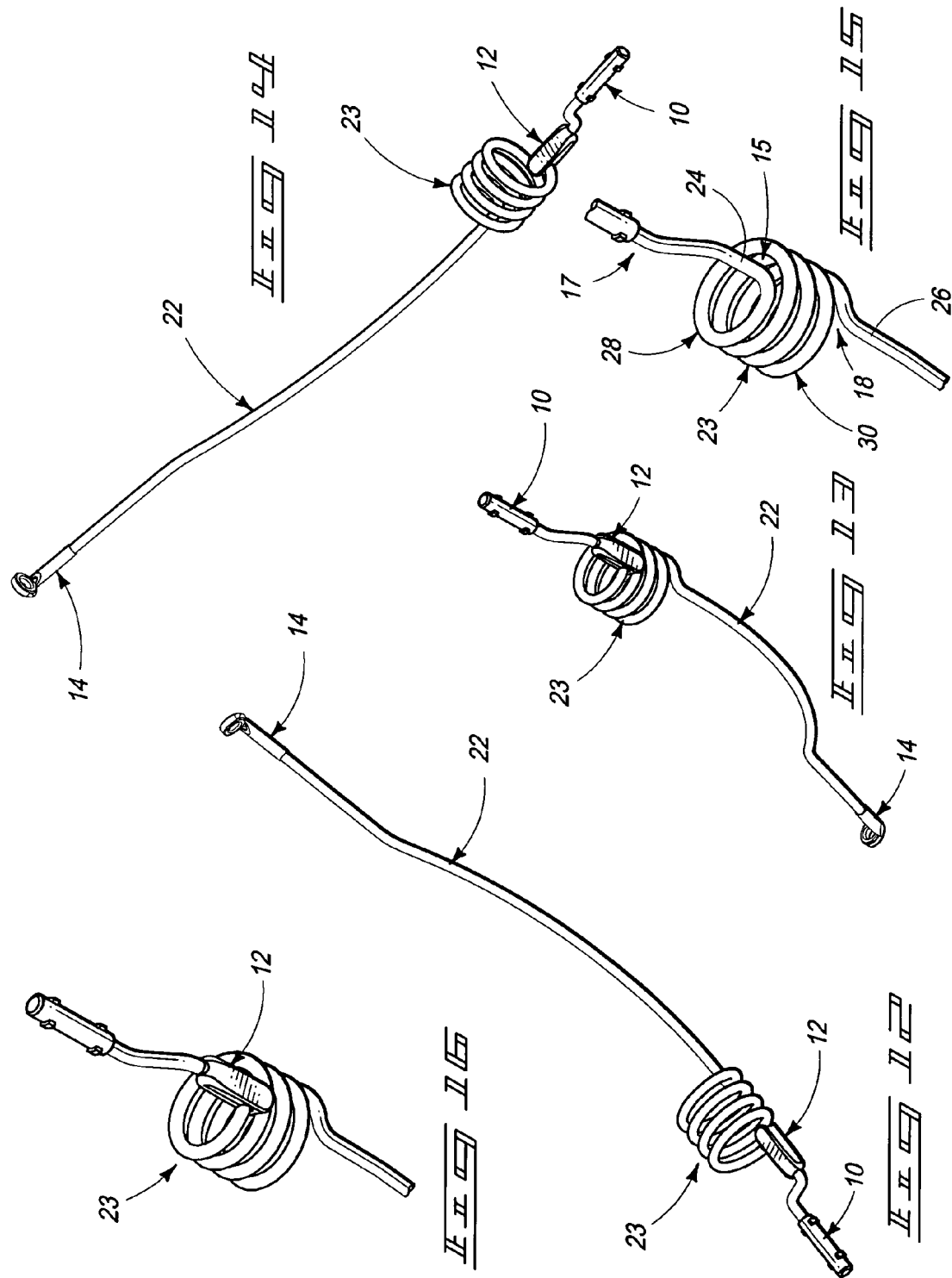

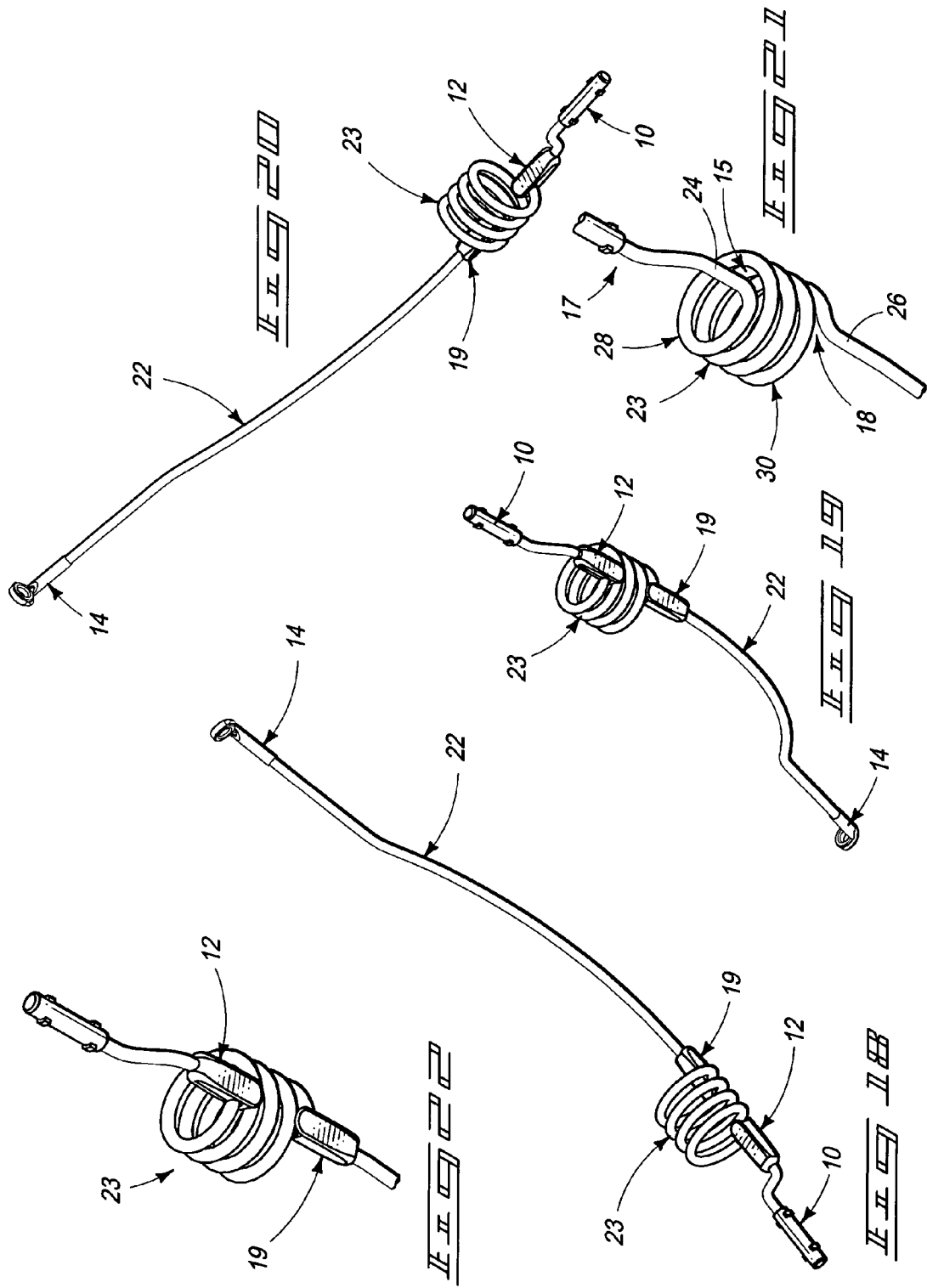

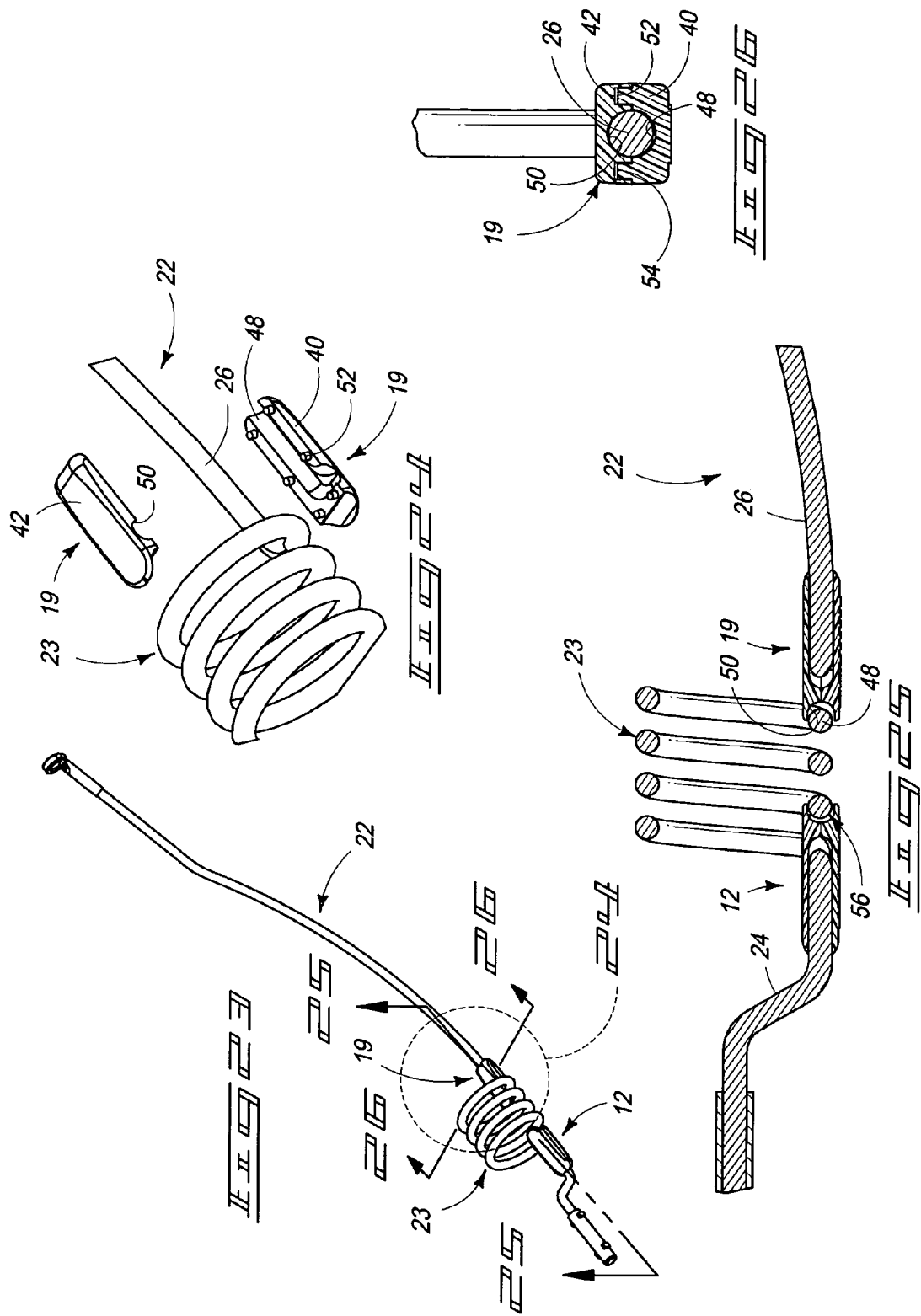

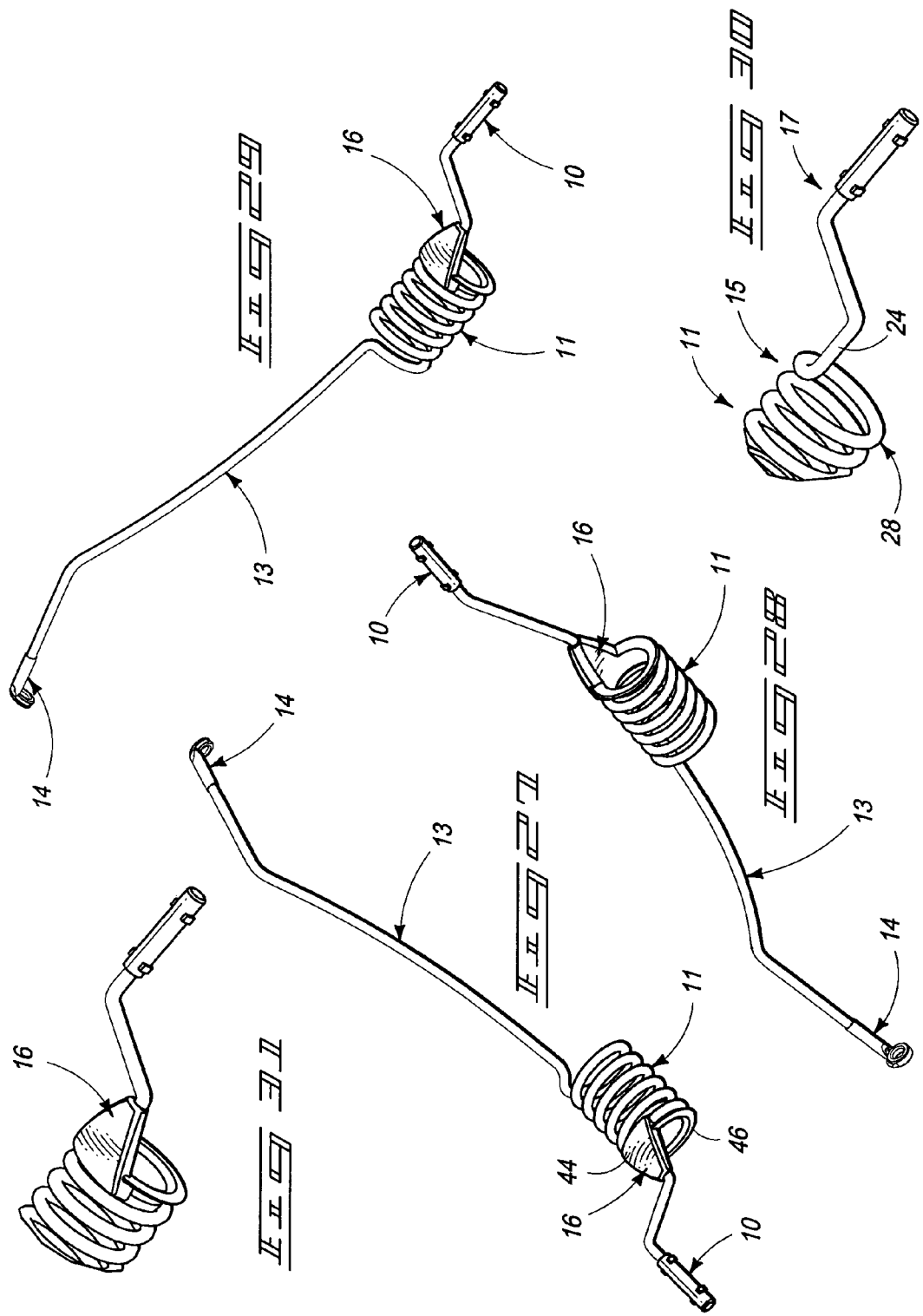

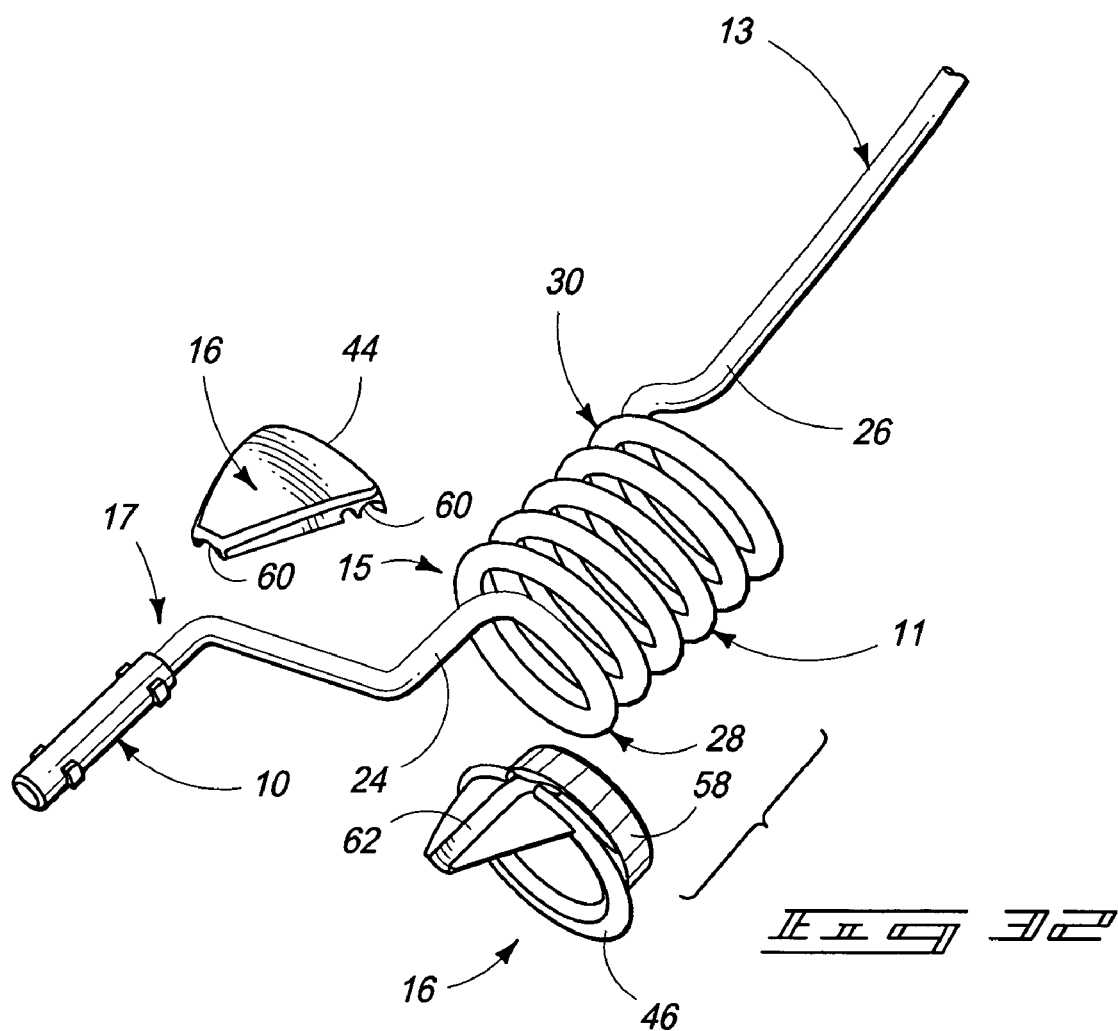

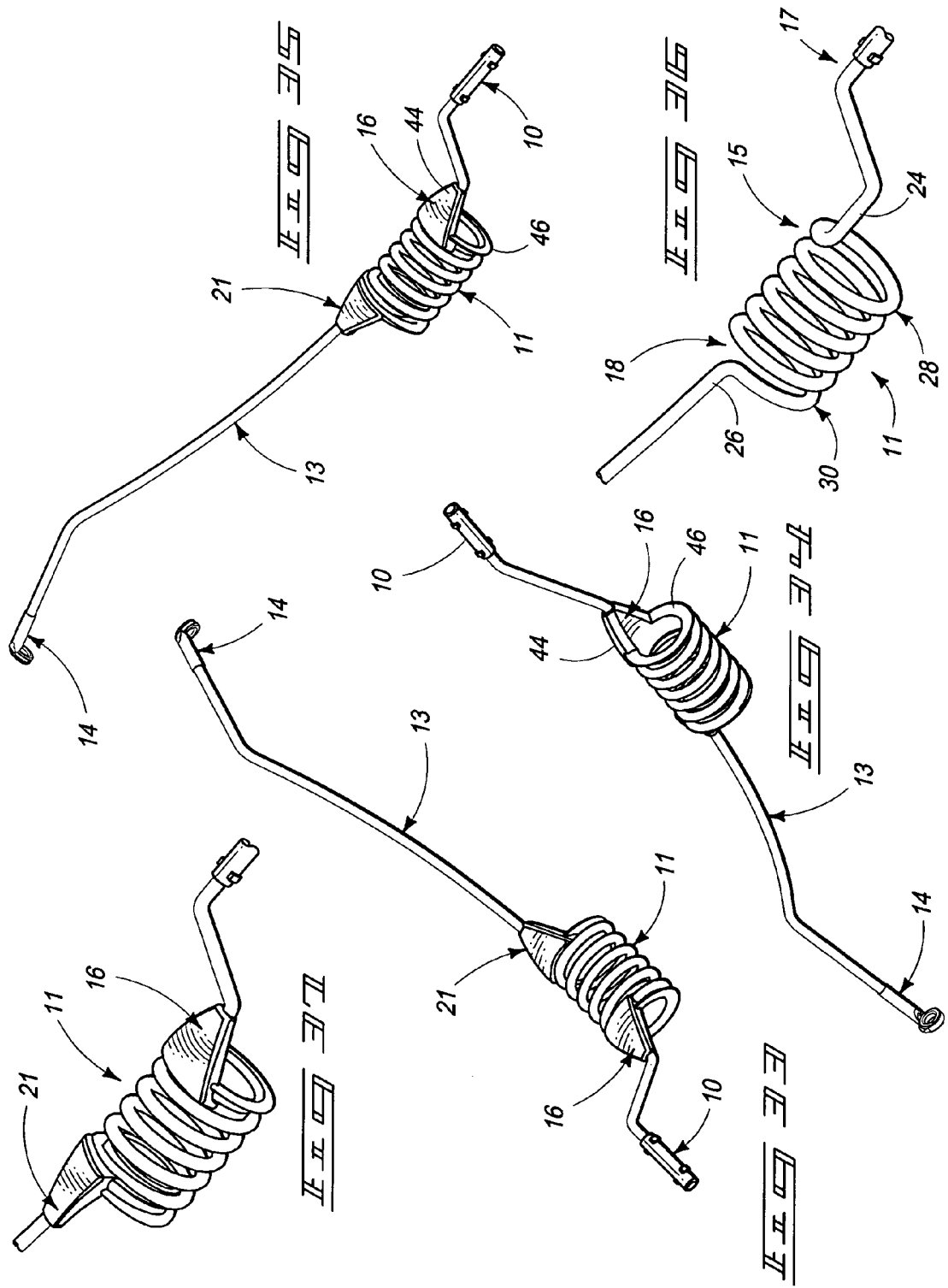

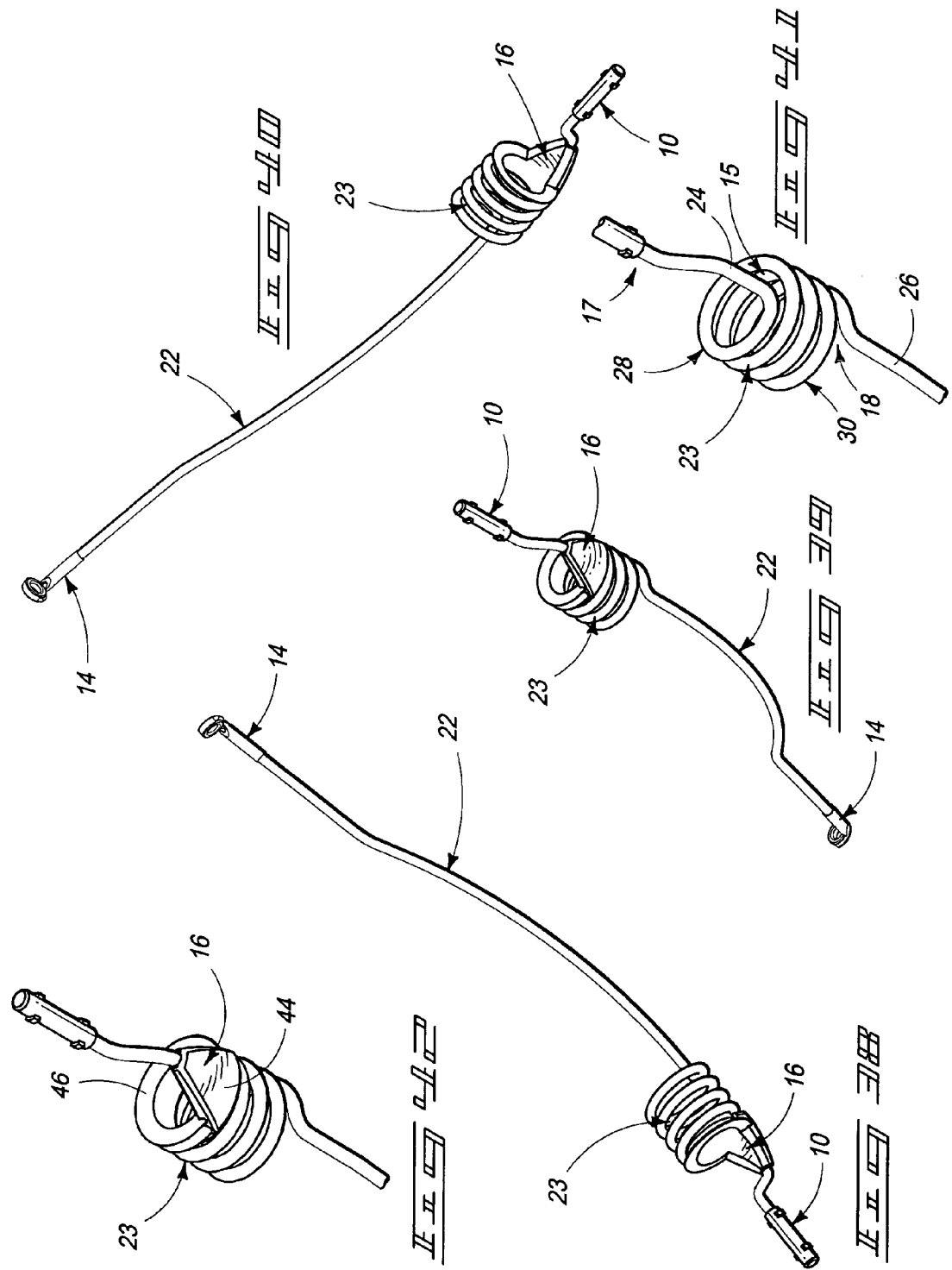

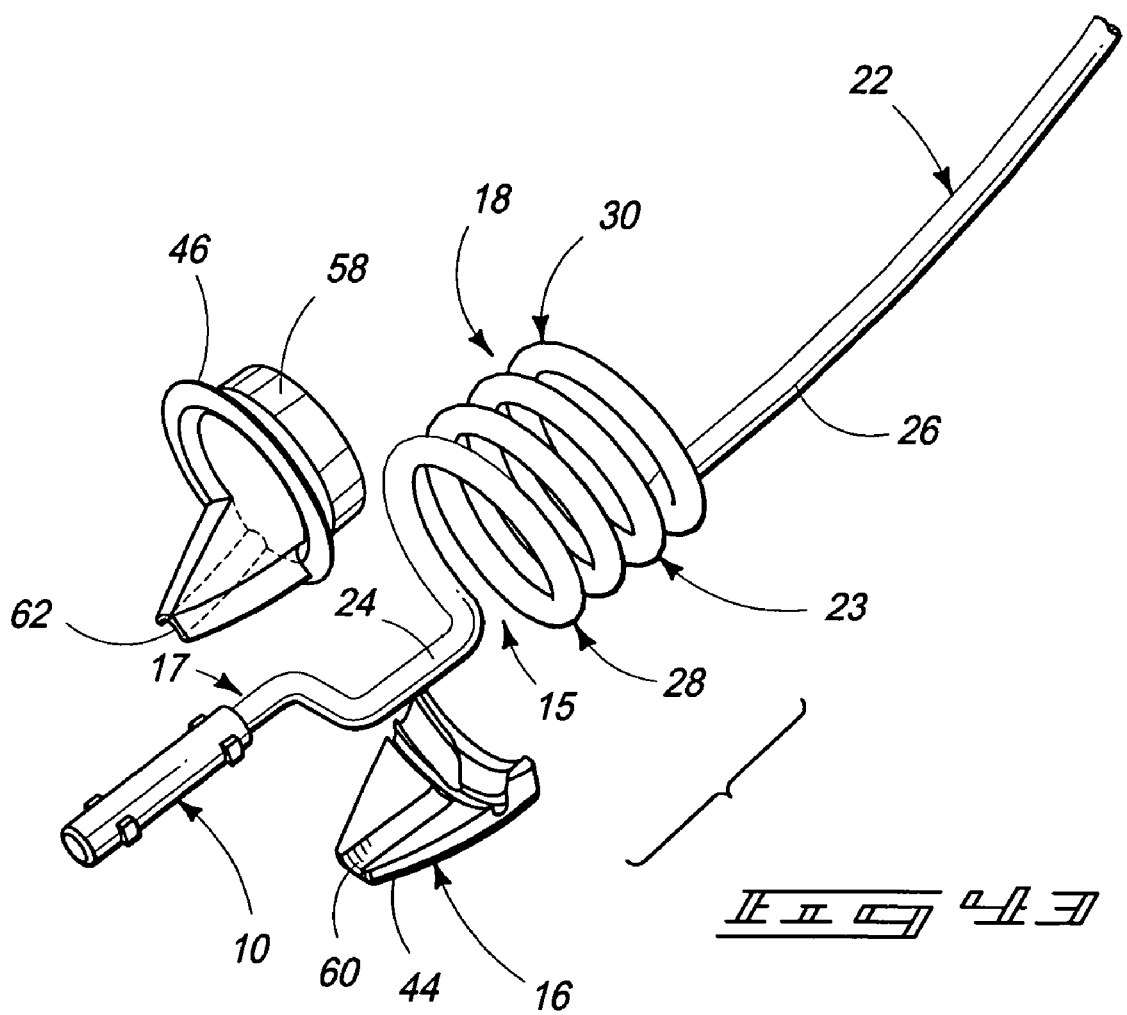

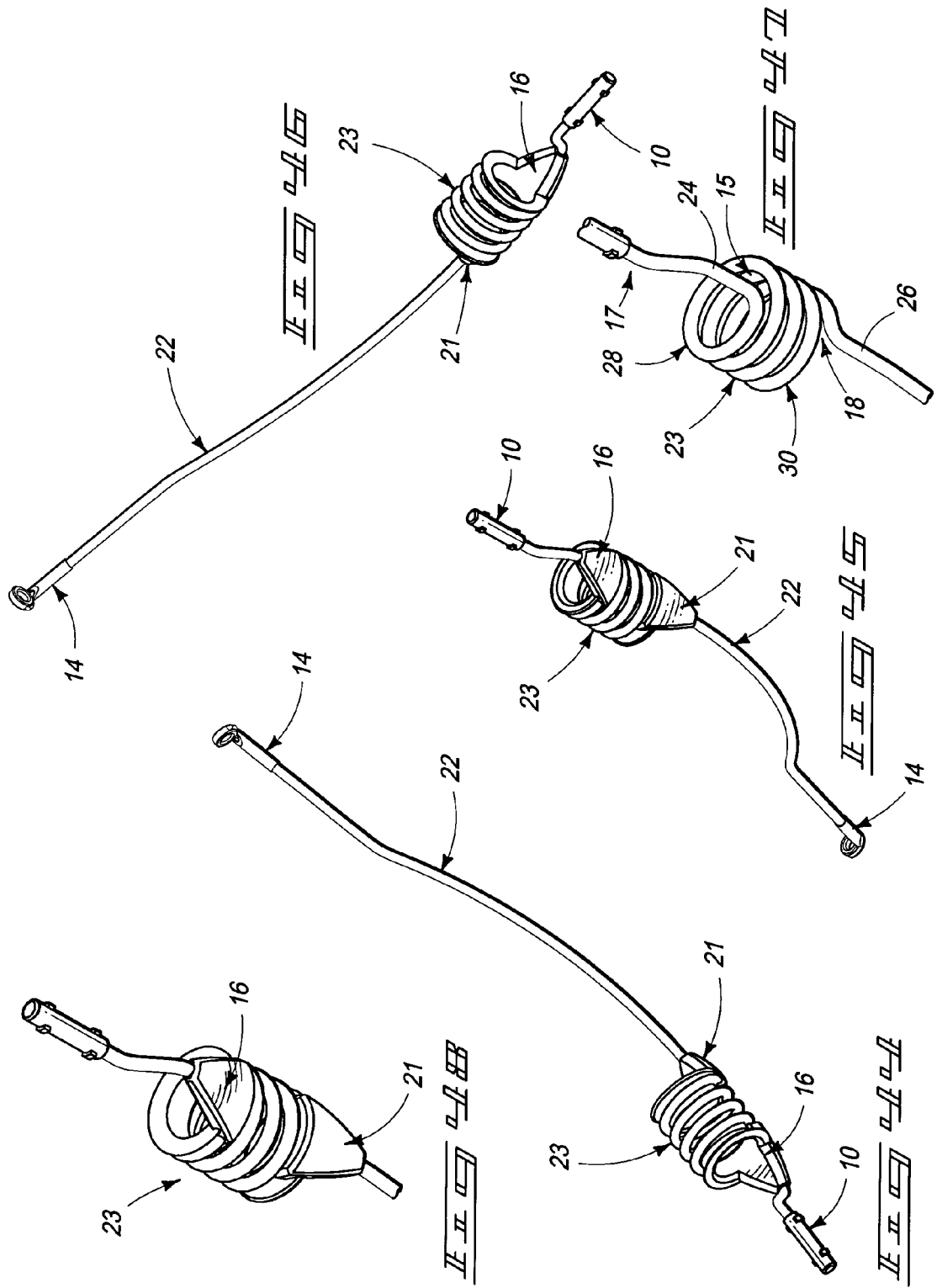

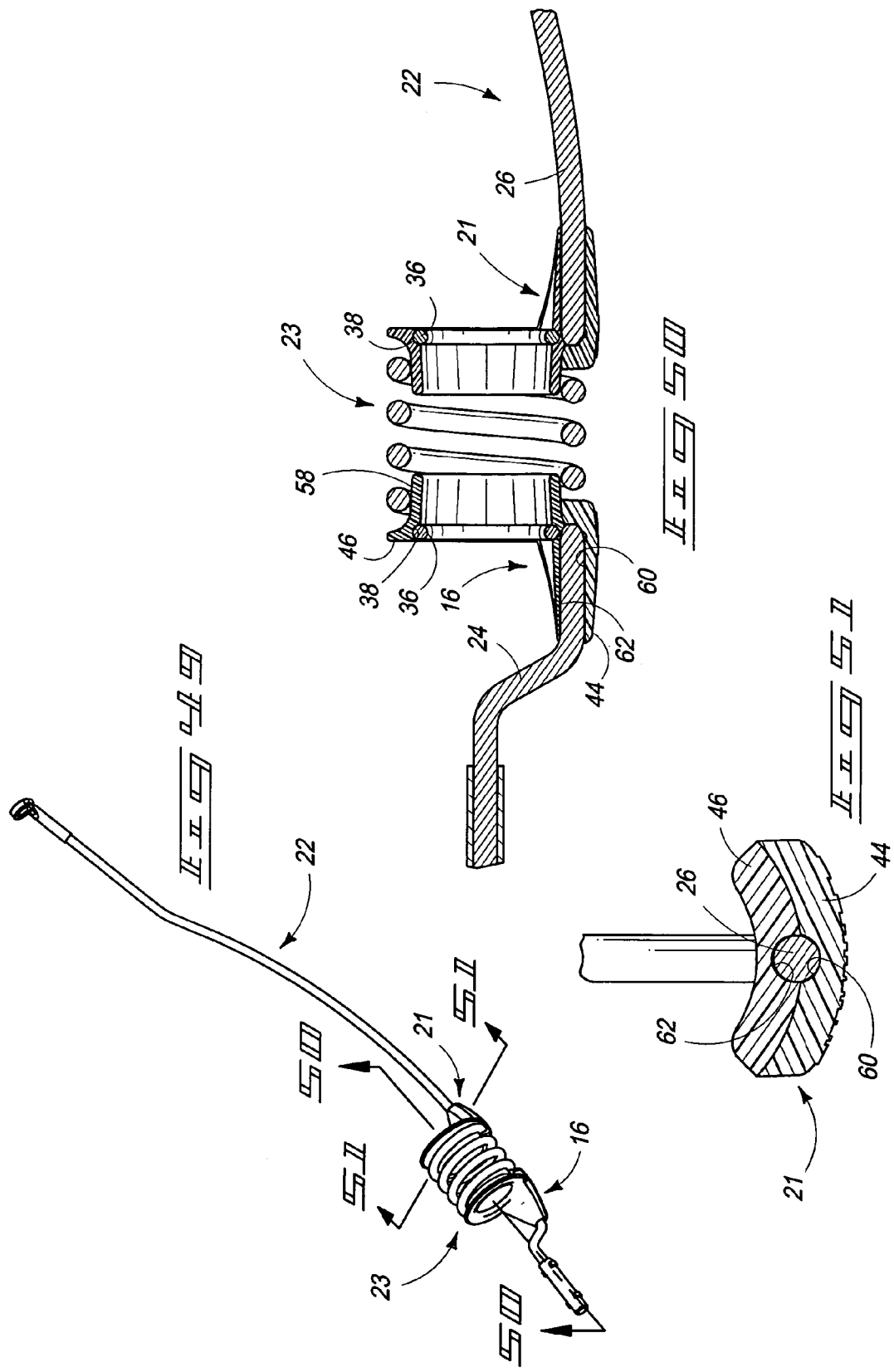

FISHING POLE, ANTI-WRAP LINE GUIDE FOR A FISHING POLE, AND FISHING ROD

RELATED PATENT DATA

This application claims the benefit of U.S. Provisional Patent Application Ser. No. 60/581,511, entitled "Anti-Wrap Line Guide on Fishing Poles and Fishing Rods", which was filed Jun. 21, 2004, and which is incorporated by reference herein.

TECHNICAL FIELD

The present invention pertains to fishing poles and fishing rods with a coil spring provided on the rod and used as a line guide. More particularly, the present invention relates to fishing poles and fishing rods having at least one anti-wrap line guide provided on a coil spring of the fishing rod that is configured to also guide the fishing line.

BACKGROUND OF THE INVENTION

Fishing poles have been provided with a coil spring formed in the fishing rod of the pole in a configuration that uses the coil spring as a fishing line guide, as provided in U.S. Patent Applications Publication Nos. 2005/0005499, published Jan. 13, 2005 and entitled "Fishing Rod", and 2005/0055865, published Mar. 17, 2005 and entitled "Fishing Rod Connector and Connector Assemblies for Fishing Poles", herein incorporated by reference.

Such fishing poles have a rod that is formed from a metal wire or rod that includes a coil spring that is formed into the body of the rod. The spring allows the rod to laterally flex for better casting and for retrieving a fish. Different rod diameters and coil designs allow the angler to have the ability to have various feels while using one handle. The coil also allows the rod to be relatively shorter than traditional rods and portable and still function comparably to a longer 6 to 7-foot standard sized rod. Such coil springs are formed from a continuous winding of spring steel comprising a plurality of helical coils with an open proximal end winding and an open distal end winding. However, with the use of a coil comes the problem of the fishing line becoming wrapped up in the coils when casting out line, as well as when reeling in line.

Such open end windings create a problem when the coil is also used as a line guide in that the line can helically wind around the coil, particularly when the pole is used with a spinning reel which tends to circumferentially rotate the line within the coil. Such problem even occurs when the helical coils are formed in intimate nested relationships, with no measurable-sized gaps between adjacent coils. More particularly, the coil spring is bent or flexed when loaded during casting or retrieving a fish, which further opens up the open proximal end winding and the open distal end winding. Hence, fishing line can still helically wind around the coil as it is guided through the coil spring, causing the line to twist and tangle within the coil spring. Accordingly, improvements are needed to prevent such helical winding of fishing line when received through a coil spring used as a fishing line guide on a fishing rod of a fishing pole.

SUMMARY OF THE INVENTION

A fishing pole, fishing rod, and closing segment are provided for closing an entrance gap at one end of a coil spring that is formed within a fishing rod and used as a line guide. The closing segment can be provided at the proximal end, the distal end, or both ends of the coil spring to prevent helical winding of fishing line around the coil spring. The closing segment can be integrally formed with the spring by welding a segment that closes a gap in end windings of the coil spring. Alternatively, attachment members can be provided at either or both ends of the coil spring to close the respective end windings of the coil spring.

According to one aspect, a fishing pole is provided with a handle, a rod, and a closing segment. The rod has a base, a tip end, and a coil spring provided between the base and the tip end. The coil spring is configured to receive and guide a fishing line. The rod is supported by the handle at the base, and the coil spring has a proximal end winding and a distal end winding. The closing segment is provided on one of the proximal end winding and the distal end winding to close the one of the proximal end winding and the distal end winding to prevent wrapping of the fishing line about the coil.

According to another aspect, an anti-wrap line guide is provided for a fishing pole having a coil spring line guide. The line guide includes a coil loop closing member configured to shunt a coil of the coil spring line guide.

According to yet another aspect, a fishing rod is provided with a base, a, a tip end, a coil spring, and a closing segment. The coil spring is provided between the base and the tip end. The coil spring is configured to receive and guide a fishing line. The rod is supported by the handle at the base. The coil spring has a proximal end winding and a distal end winding. The closing segment is provided on one of the proximal end winding and the distal end winding to close the one of the proximal end winding and the distal end winding to prevent wrapping of the fishing line about the coil.

BRIEF DESCRIPTION OF THE DRAWINGS

Preferred embodiments of the invention are described below with reference to the following accompanying drawings.

FIG. 1 is a perspective view taken from the right of a fishing pole comprising a spinning pole with a spinning rod and reel, with the rod having a coil spring formed into the body of the rod and with an anti-wrap line guide provided on a proximal end of the coil spring according to one aspect of the present invention.

FIG. 2 is a lower left perspective view of the spinning rod of FIG. 1.

FIG. 3 is an upper left perspective view of the spinning rod of FIGS. 1-2.

FIG. 4 is an enlarged partial perspective view of the coil spring of the spinning rod of FIGS. 1-3 prior to installing an anti-wrap line guide.

FIG. 5 is an enlarged partial perspective view of the coil spring of FIG. 4 after installing the anti-wrap line guide to a proximal end of the coil spring.

FIG. 6 is an enlarged and exploded partial perspective view of the coil spring and anti-wrap line guide of FIG. 5.

FIG. 7 is a perspective view taken from the right of a fishing pole comprising a spinning pole with a spinning rod and reel, with the rod having a coil spring formed into the body of the rod and with an anti-wrap line guide provided on a proximal end of the coil spring an another anti-wrap line guide provided on a distal end of the coil spring according to another aspect of the present invention.

FIG. 8 is a lower left perspective view of the spinning rod of FIG. 7.

FIG. 9 is an upper left perspective view of the spinning rod of FIGS. 7-8.

FIG. 10 is an enlarged partial perspective view of the coil spring of the spinning rod of FIGS. 7-9 prior to installing a pair of anti-wrap line guides.

FIG. 11 is an enlarged partial perspective view of the coil spring of FIG. 4 after installing the anti-wrap line guides to a proximal end and a distal end of the coil spring.

FIG. 12 is a perspective view taken from the right of a fishing pole comprising a casting pole with a casting rod and reel, with the rod having a coil spring formed into the body of the rod and with an anti-wrap line guide provided on a proximal end of the coil spring according to yet another aspect of the present invention.

FIG. 13 is a lower left perspective view of the spinning rod of FIG. 12.

FIG. 14 is an upper left perspective view of the spinning rod of FIGS. 12-13.

FIG. 15 is an enlarged partial perspective view of the coil spring of the casting rod of FIGS. 12-14 prior to installing an anti-wrap line guide.

FIG. 16 is an enlarged partial perspective view of the coil spring of FIG. 15 after installing the anti-wrap line guide to a proximal end of the coil spring.

FIG. 18 is a perspective view taken from the right of a fishing pole comprising a casting pole with a casting rod and reel, with the rod having a coil spring formed into the body of the rod and with an anti-wrap line guide provided on a proximal end of the coil spring and another anti-wrap line guide provided on a distal end of the coil spring according to even another aspect of the present invention.

FIG. 19 is a lower left perspective view of the spinning rod of FIG. 18.

FIG. 20 is an upper left perspective view of the spinning rod of FIGS. 18-19.

FIG. 21 is an enlarged partial perspective view of the coil spring of the casting rod of FIGS. 18-20 prior to installing a pair of anti-wrap line guides.

FIG. 22 is an enlarged partial perspective view of the coil spring of FIG. 21 after installing the anti-wrap line guides to a proximal end and a distal end of the coil spring.

FIG. 23 is a partially exploded perspective view of the casting rod of FIGS. 18-22 illustrating assembly of the anti-wrap line guides to the coil spring.

FIG. 24 is an enlarged partial perspective view of the coil spring and distal anti-wrap line guide of FIG. 23.

FIG. 25 is a partial vertical centerline sectional view of the casting rod, coil spring and anti-wrap line guides taken along line 25-25 of FIG. 23.

FIG. 26 is a vertical sectional view of the distal anti-wrap line guide taken along line 26-26 of FIG. 23.

FIG. 27 is a perspective view taken from the right of a fishing pole comprising a spinning pole with a spinning rod and reel, with the rod having a coil spring formed into the body of the rod and with an alternatively constructed anti-wrap line guide, over that depicted in FIGS. 1-26, provided on a proximal end of the coil spring according to a further aspect of the present invention.

FIG. 28 is a lower left perspective view of the spinning rod of FIG. 27.

FIG. 29 is an upper left perspective view of the spinning rod of FIGS. 27-28.

FIG. 30 is an enlarged partial perspective view of the coil spring of the spinning rod of FIGS. 27-30 prior to installing an anti-wrap line guide.

FIG. 31 is an enlarged partial perspective view of the coil spring of FIG. 30 after installing the anti-wrap line guide to a proximal end of the coil spring.

FIG. 32 is an enlarged and exploded partial perspective view of the coil spring and anti-wrap line guide of FIG. 31.

FIG. 33 is a perspective view taken from the right of a fishing pole comprising a spinning pole with a spinning rod and reel, with the rod having a coil spring formed into the body of the rod and with the alternatively constructed anti-wrap line guide of FIGS. 27-32 provided on both a proximal end of the coil spring and a distal end of the coil spring according to yet another aspect of the present invention.

FIG. 34 is a lower left perspective view of the spinning rod of FIG. 33.

FIG. 35 is an upper left perspective view of the spinning rod of FIGS. 33-34.

FIG. 36 is an enlarged partial perspective view of the coil spring of the spinning rod of FIGS. 33-35 prior to installing a pair of anti-wrap line guides.

FIG. 37 is an enlarged partial perspective view of the coil spring of FIG. 36 after installing the anti-wrap line guides to a proximal end and a distal end of the coil spring.

FIG. 38 is a perspective view taken from the right of a fishing pole comprising a casting pole with a casting rod and reel, with the rod having a coil spring formed into the body of the rod and with an alternatively constructed anti-wrap line guide of FIGS. 27-38 provided on a proximal end of the coil spring according to yet another aspect of the present invention.

FIG. 39 is a lower left perspective view of the spinning rod of FIG. 38.

FIG. 40 is an upper left perspective view of the spinning rod of FIGS. 38-39.

FIG. 41 is an enlarged partial perspective view of the coil spring of the casting rod of FIGS. 38-40 prior to installing an anti-wrap line guide.

FIG. 42 is an enlarged partial perspective view of the coil spring of FIG. 41 after installing the anti-wrap line guide to a proximal end of the coil spring.

FIG. 43 is an enlarged and exploded partial perspective view of the coil spring and anti-wrap line guide of FIG. 38-42.

FIG. 44 is a perspective view taken from the right of a fishing pole comprising a casting pole with a casting rod and reel, with the rod having a coil spring formed into the body of the rod and with an alternatively constructed anti-wrap line guide of FIGS. 27-43 provided on a proximal end of the coil spring and another anti-wrap line guide provided on a distal end of the coil spring according to even another aspect of the present invention.

FIG. 45 is a lower left perspective view of the spinning rod of FIG. 44.

FIG. 46 is an upper left perspective view of the spinning rod of FIGS. 44-45.

FIG. 47 is an enlarged partial perspective view of the coil spring of the casting rod of FIGS. 44-47 prior to installing a pair of anti-wrap line guides.

FIG. 48 is an enlarged partial perspective view of the coil spring of FIG. 47 after installing the anti-wrap line guides to a proximal end and a distal end of the coil spring.

FIG. 49 is a partially exploded perspective view of the casting rod of FIGS. 44-48 illustrating assembly of the anti-wrap line guides to the coil spring.

FIG. 50 is a partial vertical centerline sectional view of the casting rod, coil spring and anti-wrap line guides taken along line 50-50 of FIG. 49.

FIG. 51 is a vertical sectional view of the distal anti-wrap line guide taken along line 51-51 of FIG. 49.

DETAILED DESCRIPTION OF THE PREFERRED EMBODIMENTS

Figure 17:
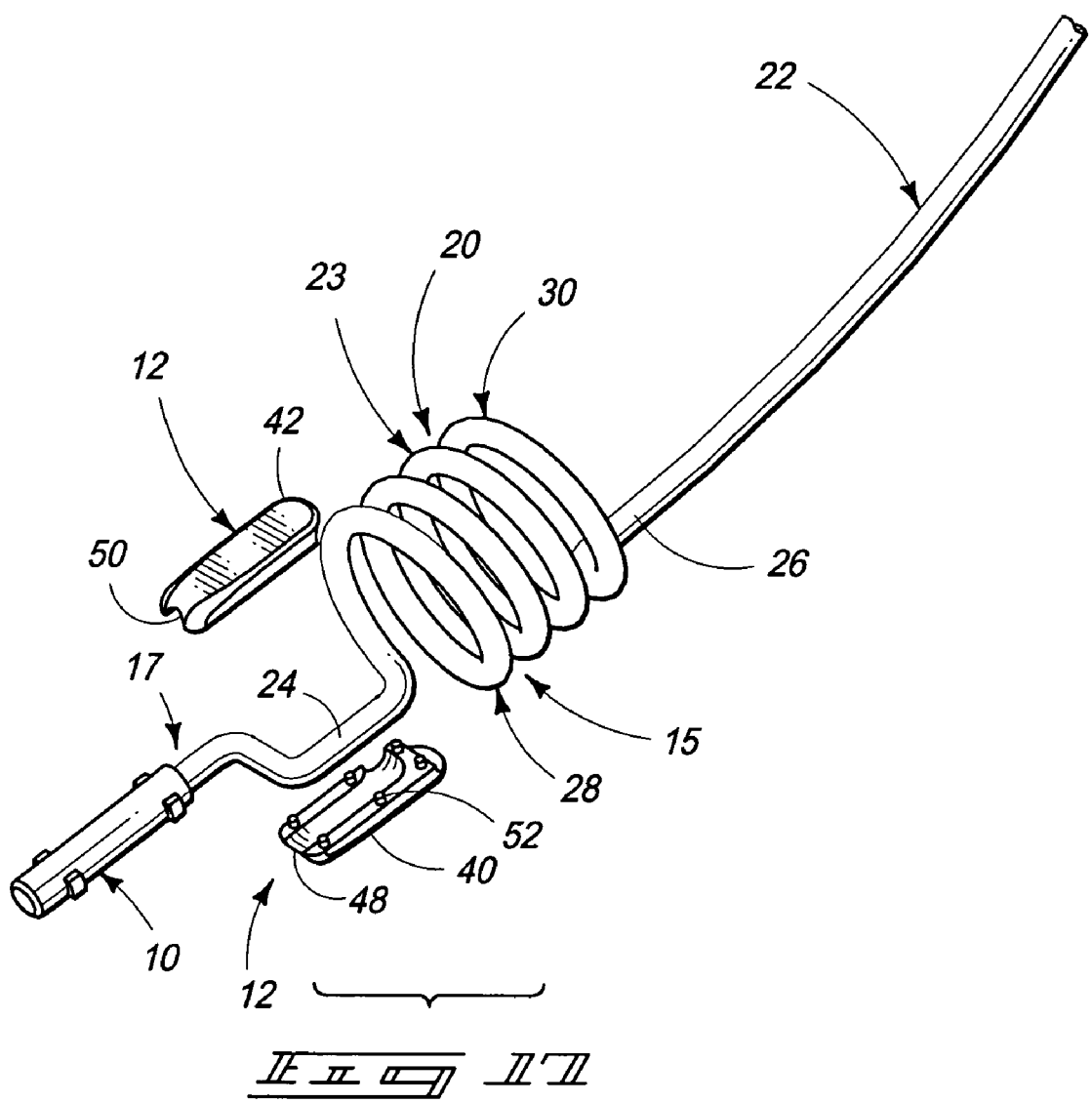
FIG. 17 is an enlarged and exploded partial perspective view of the coil spring and anti-wrap line guide of FIGS. 12-16.

This disclosure of the invention is submitted in furtherance of the constitutional purposes of the U.S. Patent Laws "to promote the progress of science and useful arts" (Article 1, Section 8).

Reference will now be made to several preferred embodiments of Applicant's invention for a fishing pole, a fishing rod, and an anti-wrap line guide for use on coil springs formed into a body of a fishing rod. While the invention is described by way of these preferred embodiments, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

FIGS. 1-26 illustrate the use of a first embodiment for anti-wrap line guides 12 and 19 provided in multiple configurations on two types of fishing rods; namely, a spinning rod 13 and a casting rod 22. Likewise, FIGS. 27-51 illustrate a second embodiment for anti-wrap line guides 16 and 21 provided in multiple configurations on a spinning rod 13 and a casting rod 22. According to such embodiments, anti-wrap line guides 12, 16, 19 and 21 each provide a closing segment 32, 34 and 33, 35, respectively, on coil springs 11 and 23, respectively, as shown in FIGS. 1, 7, 27, and 33. Such anti-wrap line guides 12, 16, 19 and 21 are assembled onto coil springs 11 and 23 after manufacture of such coil springs. Alternatively, a proximal winding 28 and a distal winding 30 of springs 11 and 23 can be manufactured by welding a metal rod segment between the adjacent rod and across the winding 28 and 30 so as to close each end winding of the coil spring 11 to prevent a fishing line from being rotationally tangled within the respective coil spring, particularly when being used with a spinning reel which rotates the line within such coil springs 11 and 23.

As configured within the fishing rods depicted in FIGS. 1-51, coil springs 11 and 23 also form line guides for a fishing line when it passes through such coil springs before exiting at a tip end of the respective fishing rod via a line guide, such as line guide 25 of FIG. 1. When a spinning reel 6 is used, the line unwinds from the reel in a conical pattern when casting and winds onto the reel when retrieving, which tends to cause the line to rotate around an inner circumference of coil spring 11 which can otherwise lead the line to wind up the helical gap of coil spring 11, causing entanglement therein. Likewise, the provision of a closing segment on a distal end of the coil spring prevents a fishing line from winding within the helical gap of the helical spring when retrieving a fishing line, especially when fighting a fish which tends to otherwise bend the fishing rod in lateral and downward directions. Such action flexes the coil spring and opens an end gap in the end winding.

Even for the case where a coil spring is provided on a fishing rod and the adjacent windings are nested together in intimate contact, in an unloaded state, there exists a problem with a fishing line winding up the helical gap that is imparted between adjacent windings of the coil spring when the rod is being bent during casting as well as during retrieving a fish. Hence, such a problem is found in prior art poles having coil springs used as line guides even where the windings are nested together in intimate contact. Accordingly, the provision of a closing segment according to this invention eliminates such a problem.

For the case where anti-wrap line guides 12, 16, 19 and 21 are used on a fishing pole, such line guides enable flexing of the end windings 28 and 30, which means that the fishing rod is imparted with further flexibility. For the alternative construction where the end windings 28 and 30 are closed by welding an axially extending rod segment between an end coil and a next adjacent coil to close the gap in the initial end windings 28 and 30, the coil spring will not impart as much flex to the fishing rod.

FIGS. 1-6 illustrate the provision of an anti-wrap line guide 12 on a proximal end of a coil spring 11 that is configured to guide a fishing line therethrough on a spin casting style fishing pole 4. Pole 4 has a handle 8 with a reel seat on which a spin casting style fishing reel 6 is removably affixed. A female connector 9 is provided on handle 8 which enables coupling and decoupling with a complementary male connector 10 on a spin casting style fishing rod 13. Further details of such connectors 9 and 10 are disclosed in U.S. Patent Application Publication No. 2005/0055865, published Mar. 17, 2005 and entitled "Fishing Rod Connector and Connector Assemblies for Fishing Poles", herein incorporated by reference.

Fishing rod 13 includes coil spring 11 provided integrally between a rod base 17 and rod tip end 14 as a continuously formed wire structure having a compound axis of symmetry for the coil spring relative to the base 17 and the tip end 14. The coil spring 11 having a central bore with a first axis of symmetry spaced laterally from and aligned along a second axis of symmetry for adjacent portions of the base 17 and the tip end 14. As shown in FIG. 4, proximal winding 28 of coil spring 11 forms a gap 15 which is otherwise closed by mounting anti-wrap line guide 12 onto rod 13 and coil spring 11. According to an alternative embodiment depicted in FIGS. 7-11, an identical anti-wrap line guide 19 is provided on a distal end of coil spring 11 to prevent wrapping of a fishing line during retrieval through coil spring 11 and onto a spinning reel. As shown in FIG. 11, a gap 18 is provided by winding 30 of coil spring 11 which is otherwise closed by mounting anti-wrap line guide 19 onto coil spring 11 as shown in FIGS. 7-9 and 11. If the coil spring rotates in an opposite direction helix, the guides having a mirror image to line guides 12 and 19 are used.

As shown in FIG. 4, coil spring 11 terminates at a proximal end to integrally form a longitudinal leg of fishing rod 13. Likewise, coil spring 11 terminates at a distal end to integrally form longitudinal leg 26 of fishing rod 13, as shown in FIG. 3.

According to one construction, fishing rod 13 is formed from an integrally formed piece of stainless spring steel onto which connector 10 is mounted using an aperture at a proximal end and onto which line guide 25 is similarly mounted via an aperture onto rod tip end 14. Connector 10 and rod tip end 14 can be further affixed onto ends of rod 13 via soldering, adhesive bonding, or press fit.

FIG. 6 illustrates the manner in which anti-wrap line guide 12 is assembled onto leg 24 and winding 28 of coil spring 11 so as to close gap 15 and prevent winding of a fishing line up the helical gap in coil spring 11. The anti-wrap line guide 12 has a longitudinal axis which extends along a length of the coil spring 11 such that the longitudinal axis of the anti-wrap line guide 12 is non-coincident with a longitudinal axis of the coil spring 11. More particularly, guide 12 includes a top member 40 and a bottom member 42 that are joined together via a plurality of nibs (or pins) provided in member 40 and complementary press-fit apertures 54 provided in member 42. Member 40 has an L-shaped groove 48 that mates in complementary relation with a mirror-image L-shaped groove 50 in member 42 which together cooperate to accommodate leg 24 and a beginning portion of winding 28. According to one construction, nibs 52 are slightly oversized and press-fit into aperture 54 to secure members 40 and 42 together therebetween. According to another embodiment, members 40 and 42 are further adhesively affixed together. According to further embodiments, members 40 and 42 are merely adhesively bonded together. Even further embodiments entail sonic welding together members 40 and 42. According to one such construction, members 40 and 42 are each formed from a piece of polycarbonate material. Alternatively, members 40 and 42 can be formed from metal, plastic, composite, or any other suitable structural material, including stainless steel spring steel. One suitable adhesive for affixing together members 40 and 42 comprises Loctite® adhesive Prism® 455 low odor/low bloom instant adhesive gel, available from Henkel Loctite Corp. of Rocky Hill, Conn.

FIGS. 7-11 illustrate a second embodiment wherein a second anti-wrap line guide 19 is mounted onto a distal end of coil spring 11. Anti-wrap line guide 19 is identical to line guide 12 and is assembled onto coil spring 11 in a manner similar to line guide 12. Mounting of guide 19 closes gap 18 of winding 30 as shown in FIGS. 10 and 11 when placed onto coil spring 11.

FIGS. 12-17 illustrate the provision of anti-wrap line guide 12 mounted onto a casting rod 22 having an essentially identical coil spring 23 to coil spring 11 of FIGS. 1-11. Coil spring 23 has a similar longitudinal leg at each end and a gap provided at proximal and distal ends via a proximal winding and a distal winding. Hence, anti-wrap line guide 12 is made of two components which are press-fit or adhesively bonded together to close out the proximal gap provided by coil spring 23. Likewise, casting rod 22 is formed from a piece of spring stainless steel, according to one construction.

FIGS. 18-26 illustrate another placement for anti-wrap line guides 12 and 19 on respective proximal and distal ends of coil spring 23 on a casting rod 22. Anti-wrap line guides 19 are placed in an identical manner to those depicted in FIGS. 12-17 for line guide 12, but are placed so as to close out gap 20 provided by distal winding 30 of coil spring 23, as shown in FIGS. 21 and 22. FIGS. 23-26 further illustrate the assembly of anti-wrap line guides 12 and 19 onto coil spring 23 of casting rod 22.

As shown in FIG. 25, grooves 48 and 50 of each anti-wrap line guide 19 (as well as guide 12) cooperate to form a slightly oversized groove that provides a gap 56 between a next adjacent winding of coil spring 23. Such gap 56 enables flexing of coil spring 23 during casting and retrieving which causes casting rod 22 to flex and bend, especially due to the flexing and bending of coil spring 23. If such gap 56 is not provided, the flexing of coil spring 23 will be reduced. However, it is desirable that gap 56 is sized to receive the adjacent coil so as to prevent the inadvertent entrance of a fishing line between gap 56 and the adjacent winding.

FIG. 26 further illustrates the assembly of members 40 and 42 via nibs 52 and apertures 54 about longitudinal leg 26 of anti-wrap line guide 19. Longitudinal leg 26 is sized to snugly fit within complementary grooves 48 and 50 of members 40 and 42, respectively.

FIGS. 27-32 illustrate the implementation of an alternatively designed anti-wrap line guide 16 over line guide 12 depicted in FIGS. 1-26. More particularly, anti-wrap line guide 16 completely encircles a proximal winding of coil spring 11 to prevent winding of a fishing line that is passed through coil spring 11. Anti-wrap line guide 16 is formed by adhesively affixing together a ferrule-shaped member 46 and a cap 44 about a distal end of coil spring 11. As shown in greater detail in FIG. 50, a ceramic ring 36 is provided within a ferrule-shaped member 46 to reduce wear as a fishing line is passed through the ferrule of line guide 16 (as well as line guide 21). According to the construction depicted in FIG. 50, a circumferential groove 38 is provided in ferrule-shaped member 46 into which ceramic ring 36 is press-fit.

More particularly, FIGS. 27-32 illustrate the placement of alternatively constructed anti-wrap line guide 16 in order to close out a gap 15 in proximal winding 28 of coil spring 11 (see FIG. 30). When assembled, anti-wrap line guide 16 closes out such gap, as illustrated further in FIG. 31.

FIG. 32 further illustrates the assembly of anti-wrap line guide 16 onto longitudinal leg 24 and proximal winding 28 of coil spring 11. More particularly, an L-shaped groove 60 is provided on cap member 44 and a mirror-image complementary L-shaped groove 62 is provided on ferrule-shaped member 46. A cylindrical insert portion 58 on the ferrule-shaped member 46 is inserted coaxially within the proximal end of coil spring 11 with a slight gap provided therebetween so as to allow flexing of coil spring 11. Groove 62 is aligned with longitudinal leg 24, after which cap member 44 is adhesively affixed onto complementary, mating portions of ferrule-shaped member 46. Accordingly, gap 15 is closed out on proximal winding 28 of coil spring 11. As shown below with respect to FIGS. 33-37, another identical anti-wrap line guide 21 (to line guides 16) is affixed onto a distal end of coil spring 11 in a similar manner so as to close out a gap provided in a gap 18 in end winding 30 of coil spring 11, as shown in FIG. 36. Closeout of gap 18 by line guide 21 is illustrated further in FIG. 37.

FIGS. 38-43 illustrate the assembly of anti-wrap line guide 16 onto a casting rod 22 in a virtually identical manner by adhesively bonding together members 44 and 46. According to such construction, members 44 and 46 are each made from a plastic material such as a polycarbonate material which is adhesively bonded together. Alternatively, members 44 and 46 are sonic-welded together. Even furthermore, such members 44 and 46 can be affixed together via fasteners such as screws or bolts. Even furthermore, members 44 and 46 can be provided with complementary mating nibs and apertures which press or snap-fit together to lock members 44 and 46 together in assembly about respective portions of coil spring 23. Optionally, a single member can be used that is press-fit onto the rod.

FIG. 43 further illustrates the assembly of members 44 and 46 about longitudinal leg 24 and proximal winding 28 of coil spring 23. As shown in FIG. 43, cap member 44 has an L-shaped groove 60 that mates in complementary relation with a L-shaped groove 62 on ferrule-shaped member 46 to receive longitudinal leg 24 and a portion of proximal winding 28, thereby closing out gap 15.

FIGS. 44-51 illustrate the provision of anti-wrap line guide 21 in addition to line guide 16, wherein line guide 21 is provided on a distal end of coil spring 23. Line guide 21 is identical to line guide 16 and is provided to close out gap 18 on distal winding 30 of coil spring 23 (see FIG. 47). In assembly, line guide 21 closes out such gap on coil spring 23, as shown in FIG. 48.

FIGS. 49-51 further illustrate the assembly of anti-wrap line guides 16 and 21 onto coil spring 23 of casting rod 22. More particularly, FIG. 50 shows the insertion of cylindrical insert portion 58 of ferrule-shaped member 46 coaxially within a proximal end of coil spring 23. Preferably, cylindrical insert portion 58 is sized slightly smaller than an inner diameter of coil spring 23, when coil spring 23 is provided in an unloaded configuration. Hence, coil spring 23 is provided with sufficient room to flex and impart bending action to casting rod 22 during use while fishing. As shown in FIG. 50, the coil spring is a uniform-pitch cylindrical coil spring. The optional placement of ceramic ring 36 within a circumferential groove 38 is illustrated on an inner diameter of ferrule-shaped member 46 which increases wear resistance and reduces friction with a line. Optionally, ring 36 and groove 38 can be removed, thereby providing a smooth frustoconical inner diameter surface to ferrule-shaped member 46 for guiding a line through coil spring 23. A similar construction is used on anti-wrap line guide 21.

In assembly, L-shaped grooves 60 and 62 on members 44 and 46 cooperate to receive longitudinal legs on opposed ends of coil spring 23. FIG. 51 illustrates the placement of longitudinal leg 26 between grooves 60 and 62 of members 44 and 46, respectively.

There are varieties of techniques by which a coil spring line guide and a fishing pole can be closed. Various types are shown in the previously-mentioned figures in which an anti-wrap line guide is used to close off a gap on a coil spring. A fishing rod is attached to a handle via a quarter-turn connector. The connector and its mating feature in the handle provides a locking and anti-rotation mechanism to hold the rod in place, thereby not allowing the rod to rotate once assembled. The fishing line is routed from the reel, through the rod coil, through the rod tip, and then is tied to a fishing apparatus or lure.

There are various types and various designs of rods for various different types of fishing. Although there are various types of rods, the present invention is used on a rod that is designed and produced with a coil spring allowing the action required to cast and retrieve fish. Therefore, each of these rods benefits from the use of an anti-wrap line guide. Once a fishing line has been routed through a rod, an angler then casts the tied-on fishing apparatus (or lure) by various methods. An angler can cast a lure and line by a whipping motion, a flipping motion, or he can even cast by a sling-shot motion.

Either way the line is cast, as the line leaves the reel it leaves in a large circular motion and then travels out along the rod in a circular motion. As the line travels in this circular motion, it encounters the coil spring and begins to enter the coil at a proximal winding and begins to wrap around the coils. As the line is reeled back into the reel, the line again travels in a circular motion and again encounters the coil spring and begins to enter the coil at a distal winding.

By placing an anti-wrap line guide in place on the various rods at the coil gap on each end winding, the line cannot enter the coil gap. The anti-wrap line guide is assembled and secured over the rods such that it extends from the first coil over the second coil, thereby closing the gaps of the coils. Closing these gaps prevents the line from entering the coil gaps as when the line travels in a circular motion, it encounters the anti-wrap line guides causing the line to bounce off the anti-wrap line guides and continue to travel out the rod's tip following the fishing apparatus.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A fishing rod, comprising:
    a base;
    a tip end;
    a coil spring provided between the base and the tip end as a continuously formed wire structure having a compound axis of symmetry for the coil spring relative to the base and the tip end, the coil spring having a central bore with a first axis of symmetry spaced laterally from and aligned along a second axis of symmetry for adjacent portions of the base and the tip end and extending between opposed ends of the coil spring and configured to receive and guide a fishing line through the bore, the rod supported by the handle at the base, and the base and tip end cooperating to provide a longitudinally extending, non-looping rod, the coil spring having a proximal end winding and a distal end winding, one of the proximal end winding and the distal end winding communicating with the adjacent portion of one of the base and the tip end respectively and having an outer mating surface; and
    an end winding closing segment having a longitudinal axis which extends along a length of the coil spring and a receiving surface engaging with the outer mating surface of the one of the proximal end winding and the distal end winding which retains the end winding closing segment to span the one of the proximal end winding and the distal end winding to close the one of the proximal end winding and the distal end winding to prevent wrapping of the fishing line within windings of the coil spring. wherein the longitudinal axis of the end winding closing segment is non-coincident with a longitudinal axis of the coil spring.

2. The fishing rod of claim 1 wherein the end winding closing segment includes a pair of complementary mating members engaging with the outer mating surface of the one of the proximal end winding and the distal end winding to close the one of the proximal end winding and the distal end winding of the coil spring.

3. A fishing pole, comprising:
    a handle;
    a rod having a base, a tip end, and a coil spring provided between the base and the tip end as a continuously formed wire structure having a compound axis of symmetry for the coil spring relative to the base and the tip end, the coil spring having a central bore with a first axis of symmetry spaced laterally from and aligned along a second axis of symmetry for adjacent portions of the base and the tip end and extending between opposed open ends of the coil spring and configured to receive and guide a fishing line through the bore, the rod supported by the handle at the base, and the base and the tip end cooperating to provide a longitudinally extending, non-looping rod, the coil spring having a proximal end winding and a distal end winding, one of the proximal end winding and the distal end winding communicating with the adjacent portion of one of the base and the tip end respectively and having an outer mating surface; and
    an end winding closing segment having a longitudinal axis which extends along a length of the coil spring and a receiving surface engaging with the outer mating surface of the one of the proximal end winding and the distal end winding which retains the end winding closing segment to span the one of the proximal end winding and the distal end winding to close the one of the proximal end winding and the distal end winding to prevent wrapping of the fishing line within windings of the coil spring, wherein the longitudinal axis of the end winding closing segment is non-coincident with a longitudinal axis of the coil spring.

4. The fishing pole of claim 1 wherein the pole has a line guide provided on the tip end and configured to receive and guide the fishing line.

5. The fishing pole of claim 1 wherein the coil spring is a cylindrical coil spring having an open proximal loop end and an open distal loop end.

6. The fishing pole of claim 5 wherein the cylindrical coil spring has tightly nested coils that nest together when the cylindrical coil spring is unloaded.

7. The fishing pole of claim 5 wherein the end winding closing segment comprises a line guide member which spans the one of the proximal end winding and the distal end winding to close the respective end winding.

8. The fishing pole of claim 7 wherein the line guide member is affixed onto the rod adjacent the coil spring.

9. The fishing pole of claim 1 wherein the coil spring is a spirally wound metal rod having a circumference.

10. The fishing pole of claim 1 wherein the coil spring is a uniform-pitch cylindrical coil spring.

11. The fishing pole of claim 1 wherein the closing segment is integrally formed onto the coil spring.

12. The fishing pole of claim 1 wherein the end winding closing segment further comprises one closing segment provided along the proximal end winding and another end winding closing segment provided along the distal end winding.

* * * * *

UNITED STATES PATENT AND TRADEMARK OFFICE
CERTIFICATE OF CORRECTION

| | | |
|---|---|---|
| PATENT NO. | : 7,533,484 B2 | Page 1 of 1 |
| APPLICATION NO. | : 11/158554 | |
| DATED | : May 19, 2009 | |
| INVENTOR(S) | : Markley et al. | |

It is certified that error appears in the above-identified patent and that said Letters Patent is hereby corrected as shown below:

Column 2, Line 23 – Replace "a, a tip" with --a tip--.

Column 2, Line 61 – Replace "an another" with --and another--.

Signed and Sealed this

Seventeenth Day of August, 2010

David J. Kappos
*Director of the United States Patent and Trademark Office*